UNITED STATES PATENT OFFICE.

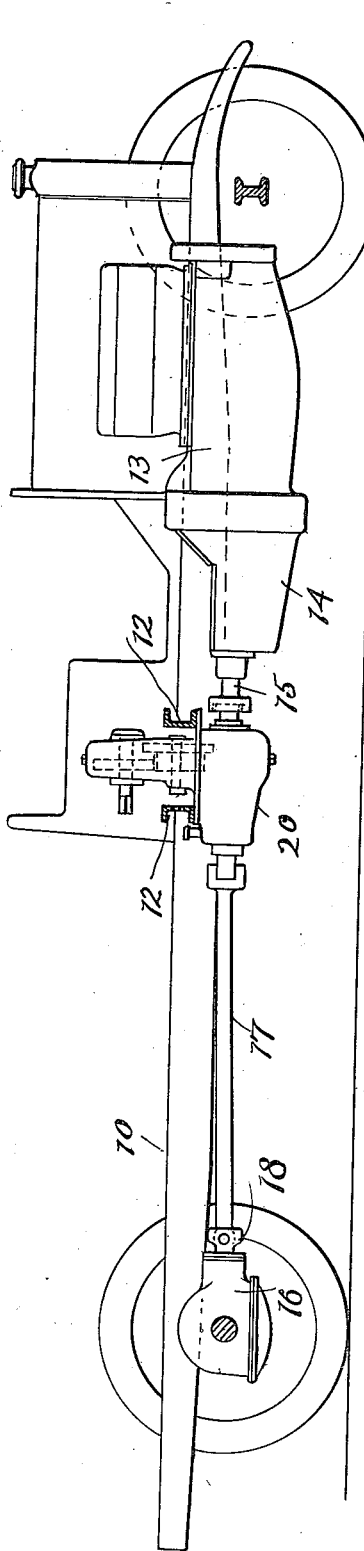

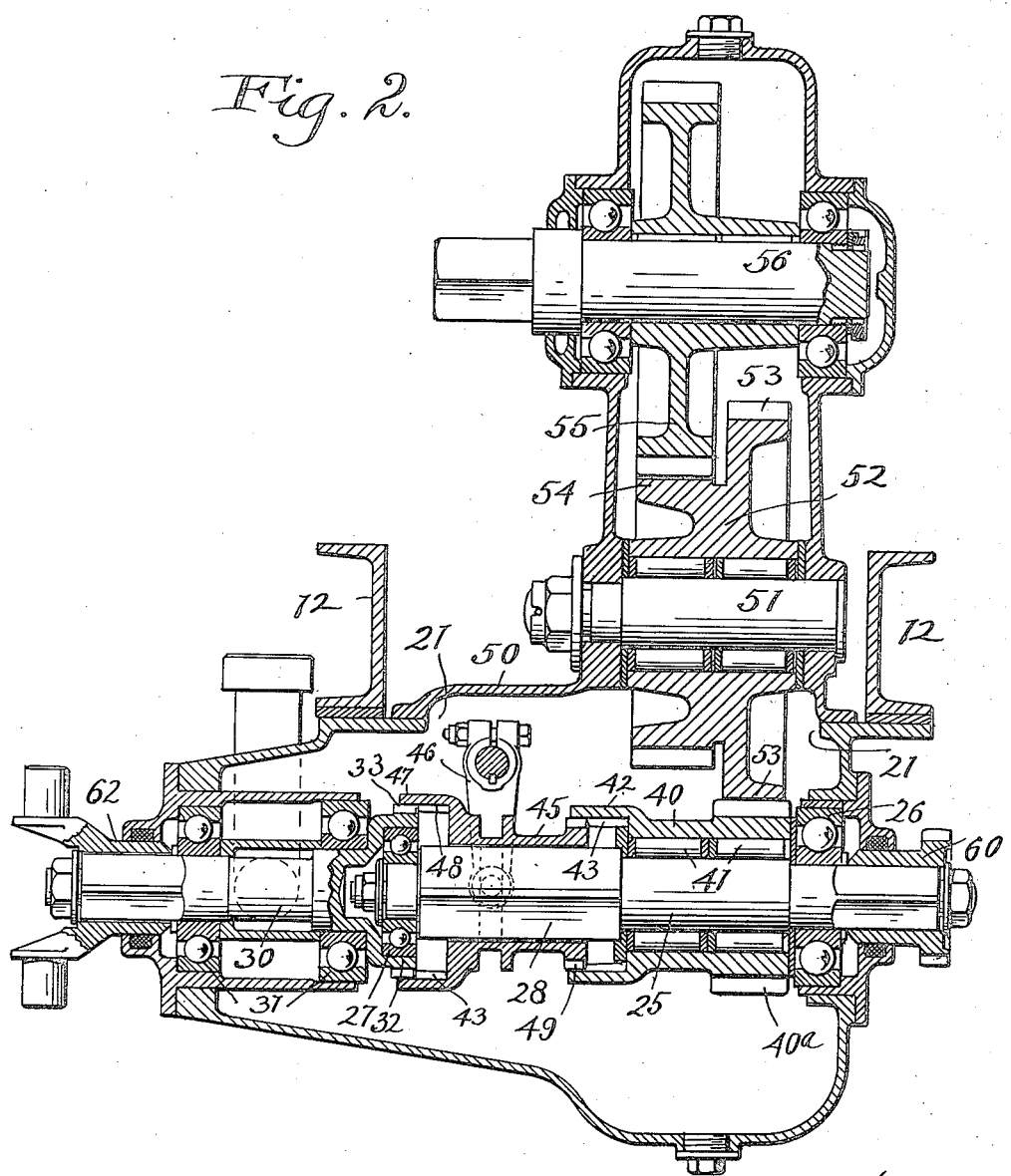

FRANK H. FARMER, OF CLEVELAND, OHIO, ASSIGNOR TO THE WHITE MOTOR COMPANY, OF CLEVELAND, OHIO, A CORPORATION OF OHIO.

POWER-TRANSMISSION MECHANISM.

1,258,883.                Specification of Letters Patent.        Patented Mar. 12, 1918.

Application filed May 21, 1917. Serial No. 169,837.

*To all whom it may concern:*

Be it known that I, FRANK H. FARMER, a citizen of the United States, residing at Cleveland, in the county of Cuyahoga and State of Ohio, have invented a certain new and useful Improvement in Power-Transmission Mechanism, of which the following is a full, clear, and exact description.

This invention relates to a power transmitting unit, and to the combination thereof with the ordinary power transmitting mechanism of a motor car; and the object is to enable the manufacturer of motor cars or the owner of a conventional motor car to adapt such a car for carrying, at any desired point thereon, a special machine, such for example, as a water pump, an air pump, an air compressor, hoisting machanism, or mechanism for raising or tilting a body, and to drive that special machine by power taken from the same motor which is primarily provided for propelling the car, either while the car is running or while it is standing still; and to do these things with very much less expense than has heretofore been involved in so doing.

To that end the invention consists in the construction and combination of parts shown in the drawing and hereinafter described and pointed out definitely in the appended claims.

In the drawings, Figure 1 is a sectional side elevation of a conventional motor car which is equipped with this invention; Fig. 2 is a central vertical longitudinal section of the power transmitting unit which has been added to a conventional motor car to form the construction shown in Fig. 1.

Referring to the parts by numerals, 10 represents one of the side frame members of the chassis of an ordinary motor car, and 12 represents two transverse members of that chassis frame, which transverse members may obviously be secured at any desired point in the length of said frame; 13 represents the crank case of the engine which is fixed to the chassis frame in the usual way; and 14 represents the casing which contains any ordinary form of change speed gearing, the rear terminal member 15 of which projects rearward from said casing.

This casing 14 is fixed to the rear end of the crank casing 13, and is supported thereby. When said motor, crank case, and casing 14 are secured together, as stated, they and their contained mechanism form what is known as a "unit power plant."

16 represents the differential casing on the rear axle; 18 the forwardly projecting member of the contained differential mechanism; and 17 the propeller shaft which, in the conventional motor car, is connected at its rear end by universal joint with the member 18, and at its front end by another universal joint with the rear terminal member 15 of the change speed gearing. In the present construction, however, this propeller shaft is shortened, and its front end is connected with the projecting rear terminal member of the power transmission unit now to be described.

20 represents the casing of this power transmitting unit; and it is so constructed that it can readily be secured to the two transverse frame members 12, with the shafts contained in said casing in alinement with the shaft 15 above referred to. Within this casing two shafts 25 and 30 are mounted in axial alinement. The rear shaft 30 is mounted on the casing in ring bearings 31 of familiar construction; and the rear end of this shaft projects out of the casing. The crank shaft 25 is mounted on the casing, adjacent its front end, in ring bearings 26 supported by the casing; and, at its rear end, it is mounted in ring bearings 27, the outer ring of which is supported within a circumferential flange 32 formed on the front end of the shaft 30.

A gear sleeve 40 is rotatably mounted upon the shaft 25; and preferably anti-friction roller bearings 41 are interposed between this gear sleeve and shaft.

A sliding clutch sleeve 45 is slidably mounted upon the shaft 25, and has a driving engagement therewith. Preferably the part 28 of said shaft 25 on which this sleeve is mounted is made square as shown, and the hole in the sleeve is correspondingly shaped. At the front and rear end of this sleeve 45 are clutch teeth constructed for engagement with corresponding teeth located respectively on the rear end of the sleeve 40, and front end of the shaft 30. Therefore by moving this clutch sleeve in one direction or the other the shaft 25 may be clutched to either the shaft 30 or the sleeve 40 as required, or to both of these at the same time. This sleeve 45 is associated with an operating lever 46 of well known construction.

In the specific construction shown this clutch sleeve 45 has at its rear end a circumferential flange 47 which is of larger diameter than the flange 32; and, in the inner periphery of this flange 47 are a plurality of longitudinal grooves 48. On the outer periphery of the flange 32 are a plurality of teeth 33, which will enter grooves 48 when sleeve 45 is moved rearward. On the rear end of the gear sleeve 40 is a circumferential flange 42 and in the inner periphery of this flange are longitudinal grooves 43 which are provided to receive teeth 49 formed on the outer periphery of the front end of the sleeve 45. The length of the sleeve 45, and of the flange 47 thereon, and of the flange 42 on sleeve 40, are such that the sleeve 45 will always clutch sleeve 40 or shaft 30 to shaft 25, and may clutch both to said shaft. It is obvious, however, that if either flange 42 or 47 or both of them were shortened enough, the sleeve could be moved to a position where neither shaft 30 nor sleeve 40 would be clutched to shaft 25, or where either of these could be clutched to said shaft at will.

In the top of the casing 20 is an opening 21 large enough for the insertion of the parts of the mechanism contained therein. 50 represents a cover casing secured over this opening, and this contains and supports a suitable train of power transmitting gearing. This may consist of the rotatable gear sleeve 52 mounted on a shaft 51 which is fixed to the cover casing. This gear sleeve may be formed with a gear 53 which is in operative engagement with a gear 40ª formed on said sleeve 40. It may also have another gear 54 which meshes with a gear 55 that is keyed to a shaft 56,—this latter shaft being mounted in the upper end of the cover casing and being projected out therefrom for engagement with whatever machinery the described mechanism is to drive. While the gear sleeve 40 is shown with a spur gear 40ª formed thereon, it is obvious that this particular form of gear is not necessary. Any suitable gearing may be employed for transmitting motion from the sleeve 40 to the shaft 56.

The projecting front end of the shaft 25 may have a sleeve 60 fixed to it, and this sleeve may be of any suitable construction and length to enable it to be operatively connected either directly or indirectly with the terminal shaft 15 of change speed gearing.

A similar sleeve 62 may be fixed to the projecting rear end of the shaft 30, and this may carry suitable means for effecting a universal joint connection with the front end of the propeller shaft 17.

From the foregoing it is apparent that when one wishes to adapt a conventional motor car for carrying any special machine and operating it at will from the engine, one has to use a shorter propeller shaft 17. One then has to secure the casing 20 at the desired point on the chassis frame and make the necessary connection between the sleeve 60 and the rear terminal member 15 of the change speed gearing. As before stated, a shorter propeller shaft 17 may now be employed to connect the rear end of the shaft 30 with the differential mechanism. If there is any special kind of power transmitting mechanism required intermediate of the gear sleeve 40 and the machine which this power unit is to drive, that special mechanism may be provided and mounted in a cover casing 50 constructed for supporting and protecting it.

Having described my invention, I claim:—

1. The combination with a conventional motor car having an engine and change speed gearing supported on the chassis frame adjacent the front end thereof, rear axle mechanism, and a forwardly projecting propeller shaft in operative engagement therewith, with a power transmitting unit comprising a casing which is fixed to the chassis frame behind the change speed gearing, two alined shafts rotatably mounted in said casing and projecting respectively forward and rearward therefrom,—the forwardly projecting end of one shaft being operatively connected with the terminal member of the change speed gear, and the rearwardly projecting end of the other shaft being operatively connected with the propeller shaft, a gear sleeve rotated upon the front shaft of said power transmitting unit, a sliding clutch sleeve mounted on the front shaft of said power transmitting unit and adapted to make a driving connection between said front shaft and said gear sleeve or rear shaft as required, a cover casing fixed to the casing of the power transmitting unit and containing and supporting a gear train, and means whereby said gear train has always an operative connection with said gear sleeve.

2. A power transmitting unit for motor cars, a casing adapted for connection with the frame of said motor car and having an opening in its top, two alined shafts rotatably mounted within said casing and projecting respectively from the front and rear ends thereof, a gear sleeve rotatably mounted on the front shaft, a sliding clutch sleeve mounted on the front shaft, the front and rear ends of said sliding clutch sleeve, the rear end of the gear sleeve, and the front end of the rear shaft being respectively formed with clutch teeth for engagement as described, and a cover casing fixed to the casing of the power transmitting unit, and a train of mechanism supported within said cover casing and in operative engagement with said gear sleeve.

In testimony whereof, I hereunto affix my signature.

FRANK H. FARMER.

Witnesses:
T. R. DAHL,
E. L. ACKERMAN.